United States Patent [19]

Giraud

[11] 3,916,806

[45] Nov. 4, 1975

[54] INSTALLATION AND METHOD FOR HEAT TREATMENT OF REFUSE AND/OR SIMILAR PRODUCTS

[75] Inventor: Yves Giraud, Paris, France

[73] Assignee: Laurent Bouillet, S.A., Paris la Defense Cedex, France

[22] Filed: June 20, 1974

[21] Appl. No.: 481,473

[30] Foreign Application Priority Data

June 20, 1973  France .............................. 73.22509
May 29, 1974  France .............................. 74.18648

[52] U.S. Cl. .................................. 110/14; 432/105
[51] Int. Cl.² ........................................... F23G 5/06
[58] Field of Search .................... 110/8 R, 14, 15; 432/105–111

[56] References Cited

UNITED STATES PATENTS

| | | | |
|---|---|---|---|
| 1,835,147 | 12/1931 | Drew | 110/14 |
| 3,436,061 | 4/1969 | Zinn | 110/14 |
| 3,489,527 | 1/1970 | Cates, Jr. et al. | 110/14 X |
| 3,682,117 | 8/1972 | Rousseau | 110/14 |
| 3,705,711 | 12/1972 | Seelandt et al. | 110/14 |

FOREIGN PATENTS OR APPLICATIONS 566,455  11/1923  France .................................. 110/14

*Primary Examiner*—Kenneth W. Sprague
*Attorney, Agent, or Firm*—Holman & Stern

[57] ABSTRACT

An installation and a method for the heat treatment of refuse of any type and similar products such as low or poor quality fuels are disclosed. The installation comprises a one piece combustion chamber formed of three coaxial parts, one of which is of truncated conical shape, and another one of which comprises an opening in its vault for collection of the combustion gas in a hood sealingly mounted onto the external wall of the chamber and covering said vault opening, means being provided for imparting to said chamber an oscillating movement around its longitudinal axis in order to propel the refuse and similar products between the entrance and the exit of the chamber.

25 Claims, 17 Drawing Figures

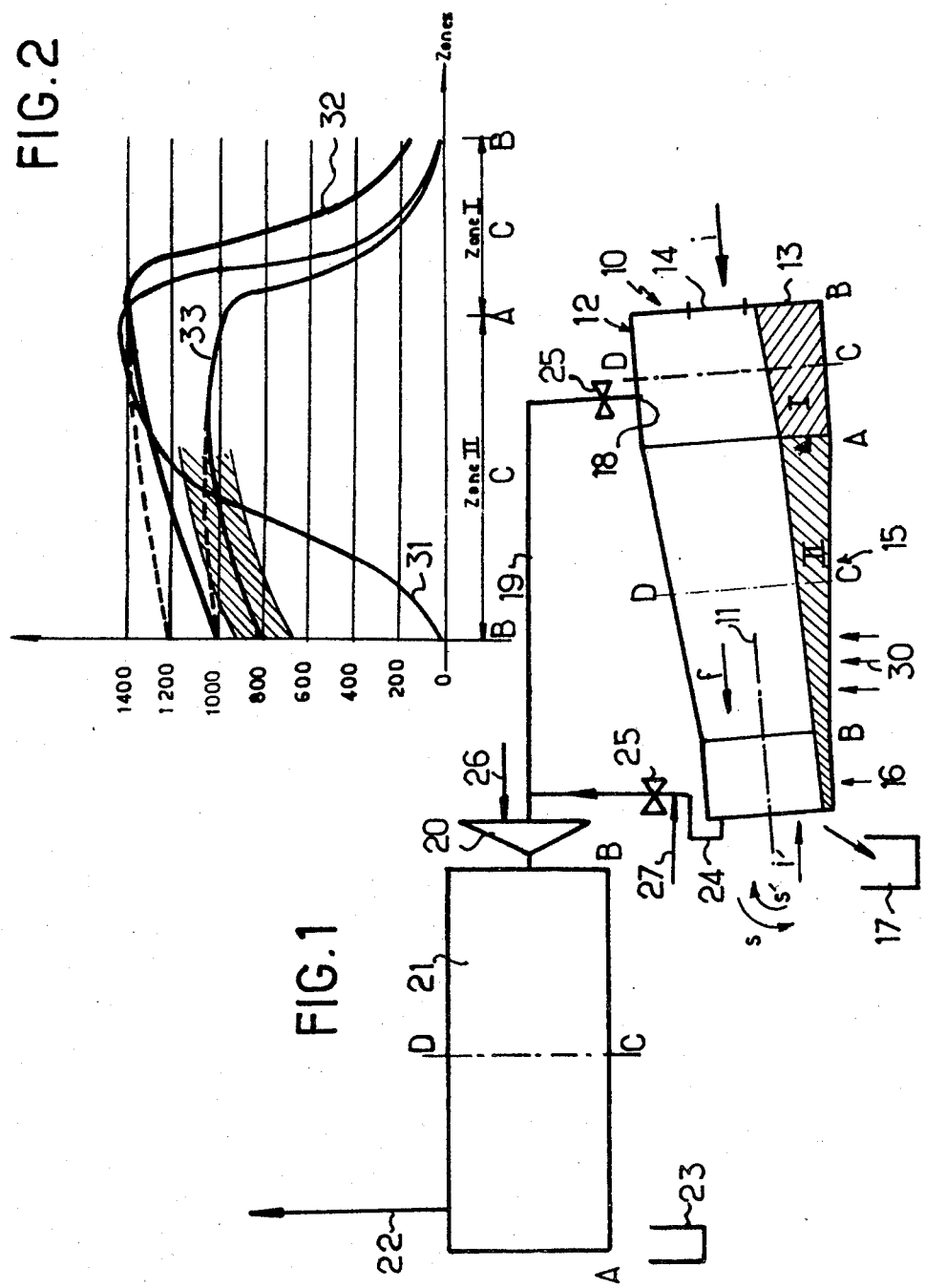

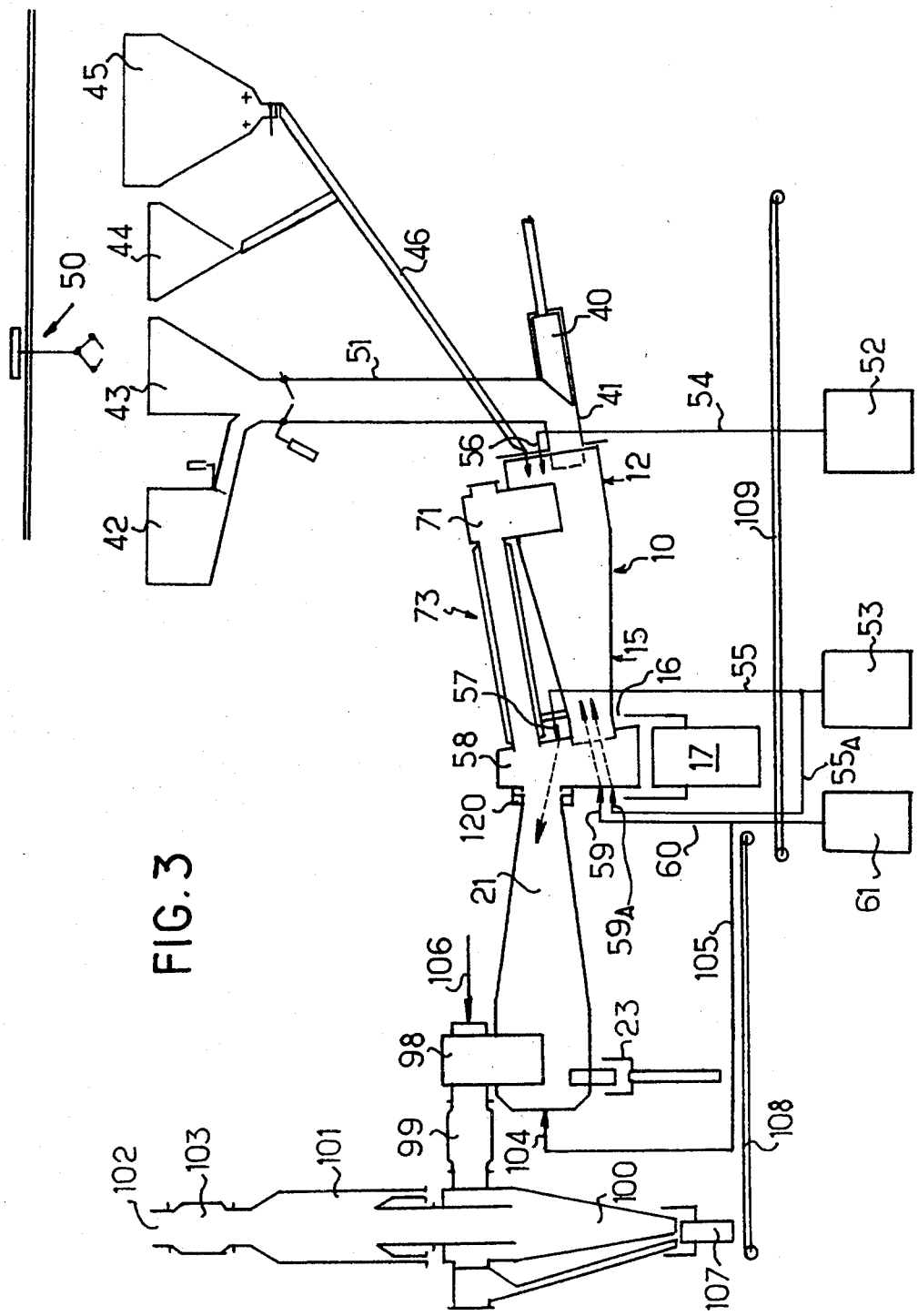

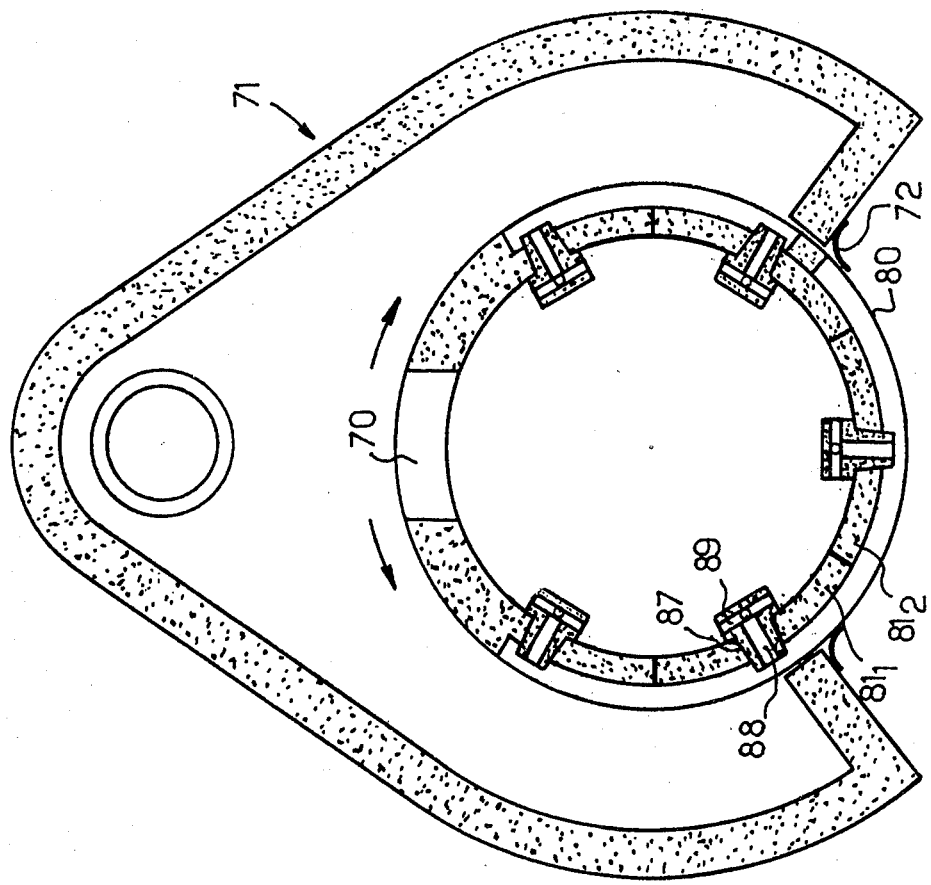
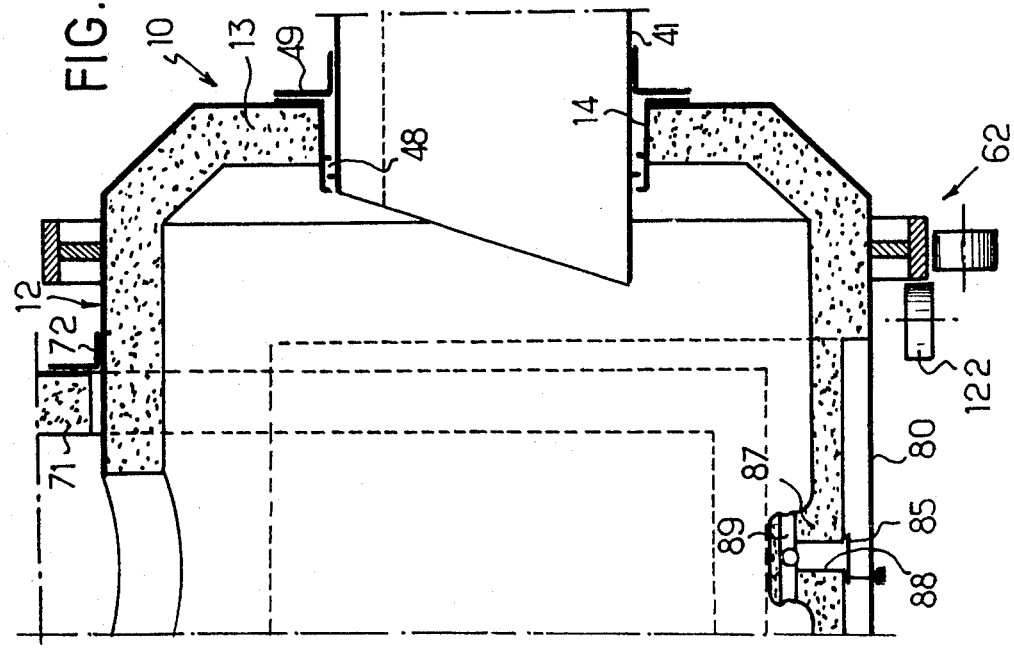

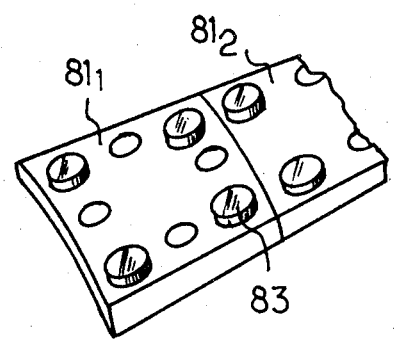
FIG. 7
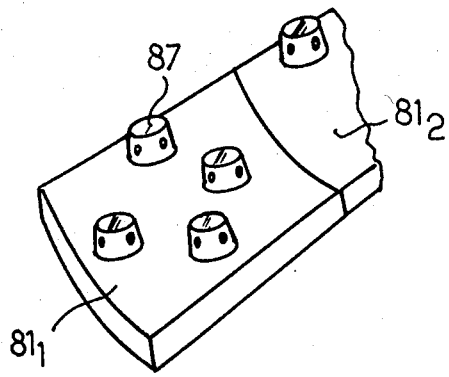
FIG. 8
FIG. 9
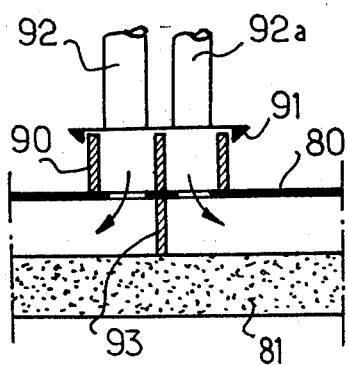

INSTALLATION AND METHOD FOR HEAT TREATMENT OF REFUSE AND/OR SIMILAR PRODUCTS

FIELD OF THE INVENTION

The object of the invention is an installation and method for the heat treatment of refuse of any type whatever and/or similar products such as low or poor quality fuels.

PRIOR ART

French Pat. No. 566,455 has already disclosed an installation for the heat treatment of refuse conprising a combustion chamber having an oscillating movement around its longitudinal axis. In this previous installation, the chamber is a cylindrical drum, so that, although it could cope with incineration of household waste, it is completely unsuitable for heat treatment of the refuse of very varied kinds now disposed of, both by urban communities and by industrial installations.

SUMMARY OF THE INVENTION

An object of the invention is, in general, to provide an installation for the heat treatment of refuse of any kind, and also of similar products such as low quality fuels, which will enable, in one and the same installation, both the use, as energy sources, of products currently rejected because of their low calorific value and the destruction, by incineration, of the most varied types of refuse, be they solid such as household waste, of a viscous consistency such as purification sludges or liquid such as used oils, industrial solvents, etc.

An object of the invention is, therefore, to supply an installation having a much wider range of application than that of known installations.

Another object of the invention is to supply such an installation which enables residual combustion products to be obtained by simple and safe means, in particular gases meeting public health requirements as regards both physical and chemical characteristics.

It is also an object of the invention to provide an installation which, by virtue of its flexibility in operation, enables economic treatment of refuse differing considerably both as regards their physical nature and calorific value, with good energy output results.

It is also an object of the invention to provide an installation which will enable direct recovery of the calories resulting from heat treatment of refuse having high calorific value, by means of a clean fluid such as air.

It is additionally an object of the invention to supply a method for the heat treatment of refuse of any type and/or of similar products such as low or poor quality fuels which facilitates incineration of the refuse and/or combustion of products of low calorific value, with both excellent output results — and therefore satisfactory economic conditions — and with a much wider range of application than that of known processes having regard to the nature of refuse and/or products treated.

An installation according to the invention for the heat treatment of refuse of any type and/or similar products, such as low or poor quality fuels, comprising a combustion chamber having an oscillating movement around its longitudinal axis in order to propel the refuse or similar products between the entrance and exit of the chamber, is characterized in that said chamber, which is made in one piece, is formed of three coaxial parts:

a. a substantially cylindrical part having a transverse end wall presenting an opening for input of the refuse or similar products;

b. a truncated conical part; and c. a cylindrical part connected to the previous part, with an opening in the vault at the downstream end of the refuse input part — in the direction of flow of the latter — said opening being an outlet for combustion gases and being covered by a gas collection hood sealingly mounted onto the external wall of the chamber.

The one piece chamber having an oscillating movement around its axis, and thus with no break in continuity between its different zones, removes the difficulties inherent in the presence of joints at the connections between fixed and turning parts of known rotating furnaces in the zones through which the treated refuse flows.

The opening in the vault of the part where the refuse is introduced into the chamber enables part or all of the combustion gases to be extracted countercurrently to the flow of the refuse, whilst causing these gases to have a direct radiation effect on the refuse introduced into the chamber.

In a preferred embodiment, this opening is about one third of the length of the chamber away from the downstream end of the latter, where the refuse is introduced.

The truncated conical part, the lower generatrix of which is horizontal or inclined to the horizontal, ensures a substantially uniform speed of flow for all the constituents under treatment, be they more or less viscous or liquid, in contradistinction to the known cylindrical furnace in which the flow speed differences between the more liquid compounds and less liquid materials result in excessively rapid flow time in the furnace for the most liquid refuse, which is consequently incompletely destroyed.

In a first embodiment, introduction into the chamber of combustive and/or cooling air is achieved by means of at least one and preferentially several flues arranged in transverse sections of the chamber which open into a continuous sleeve between a metal casing forming the external wall of the chamber and protective tiles, of refractory concrete, which line the internal surface of the chamber and which are supported at a distance from the casing. Distribution of gas within the chamber is by means of outlets extending substantially radially through the protective tiles and opening onto the internal face of the chamber at bosses or protuberances connected to and/or moulded into the refractory concrete tiles. These bosses or protuberances are designed to catch the refuse during treatment, and, simultaneously, to prevent obstruction of the openings of the outlets by the layer of refuse resting on the floor of the chamber, mainly the liquid fraction of this layer. The bosses or protuberances are, for example, cylindrical, cylindrical-conical or pyramidal in shape to take into account the problems of thermal and mechanical resistance connected with the introduction of combustive air into the chamber through outlets extending substantially radially through the protective plates; the flow to the chamber can be shut down at will by means of shutters, needle valves or similar means.

Although satisfactory results are obtained by means of this embodiment, its operation is relatively complex, especially if it is desired to constantly introduce combustion air to the mass of refuse being treated, said mass being moved by the oscillating movement of the chamber not only forward longitudinally but also transversely. In the same way, use of the continuous sleeve surrounding the refractory lining for rapid extraction of the calories produced by combustion of the refuse or similar products, can also be relatively complex.

This is why, in a second embodiment, the continuous sleeve between the external casing of the combustion chamber and the refractory lining perforated by transverse outlets is connected to a device for introducing combustion and/or cooling air into said sleeve, positioned at the downstream end of the latter with respect to the flow of the refuse, said sleeve being shut at the end opposite to where the air is introduced by means of an annular shield, which is not integral with the chamber and in which is cut a slot of arcuate configuration so as to selectively connect said sleeve and longitudinal ducts extending under the refractory lining to which said transverse outlets connect.

The transverse air injection outlets into the chamber are provided in the truncated conical part of the latter, over its entire length and also on a section of the cylindrical part but on one zone only of the refractory lining, advantageously on a spanning of about 210° of the floor and side walls of the chamber.

Simple mechanical means are contemplated to link the movement of the shield to part of the oscillating movement of the chamber, in order to achieve feeding of combustive gas to those of the outlets in the refractory lining which, at a given moment, are covered by the refuse being treated.

Said simple mechanical means can be rendered operational or non-operational as required so that feed or non-feed of combustion and/or cooling air can be adjusted as a function of the type of refuse treated.

For this purpose also, it is contemplated to provide the continuous sleeve with discharge valves, positioned close to the shield, to facilitate extraction of cooling air caused to circulate in said sleeve and, if necessary, in certain ducts of the chamber. In this way, whilst ensuring the required combustion, the particularly sensitive areas of the chamber are still kept cool, especially those near to the opening for the combustion gas outlet, thus facilitating treatment of rich refuse, such as tyres, etc.

The combustion gases extracted from the chamber, in whole or in part, through the opening in the vault of the substantially cylindrical refuse input part, are then treated in a post-combustion chamber, separate from the first chamber, which is advantageously a chamber shaped to provide at its downstream end, relative to the flow of the gases, an expansion volume of the burned gases, said end being connected at the top to a chimney venting to the atmosphere through dust removers or similar equipment and at the bottom to an ash collector for the particles contained in the burned gases.

In order that the fumes coming out of the chimney be "clean", means are provided in the installation to, if necessary, add to the combustion gases, before they pass into the post-combustion chamber or during treatment in said chamber, neutralising products containing for example basic ions for eliminating such ions as Cl, $SO_2$, $SO_3$, F, etc., present in the refuse and/or liberated during heat treatment in the furnace of the installation.

The method in accordance with the invention, for the heat treatment of refuse of any type such as household waste, liquid residues from industrial processes, purification sludges, and/or similar products such as low or poor quality fuels, in an installation comprising a combustion chamber having an oscillating movement around its longitudinal axis, is characterised in that the refuse or similar products are first subjected in said chamber, before actual combustion, to simultaneous mechanical pre-treatment due to the oscillating movement of the chamber and heat and/or chemical pre-treatment, in particular pyrolysis, by the action of direct radiation of at least a part of the combustion gases which are caused to circulate countercurrently.

Advantageously, those of the combustion gases which circulate countercurrently are extracted from the chamber at the end of the zone where pre-treatment of the refuse or similar products takes place.

The temperature of the refuse, in the pre-treatment zone, is between 200° and 600°C, the temperature of the combustion gases in and at the end of this zone being between 800° and 1500°C, whilst the temperature of the refuse or similar products during treatment is around 900° to 1800°C in the actual combustion zone where the temperature of the combustion gases is between 1000° and 2000°C.

After extraction from the chamber, the combustion gases are themselves burned in a post-combustion chamber, which is distinct from the first chamber, if necessary after adding neutralising products before emission into the atmosphere passing through physical treatment equipment such as dust-removers, cyclones or similar equipment.

Other characteristics and advantages of the invention will appear in the following description, which is given by way of example.

BRIEF DESCRIPTION OF THE DRAWINGS

FIG. 1 is a flow-sheet illustrating the method of the invention;

FIG. 2 shows the curves;

FIG. 3 is a diagrammatic overall view of a first embodiment of an installation according to the invention for heat treatment of refuse;

FIG. 5 is a partial view in lengthwise section again on a larger scale of the upstream part of a treatment chamber forming part of an installation in accordance with the invention;

FIG. 6 is a section view along the line 6—6 of FIG. 4 but on a larger scale;

FIG. 7 is a view of underneath an assembly of refractory concrete tiles lining a chamber of an installation in accordance with the invention;

FIG. 8 is a perspective representation of these tiles as seen from inside the chamber;

FIG. 9 illustrates very diagrammatically means for introducing combustive gas into the chamber shown in FIG. 4;

Figure 11:
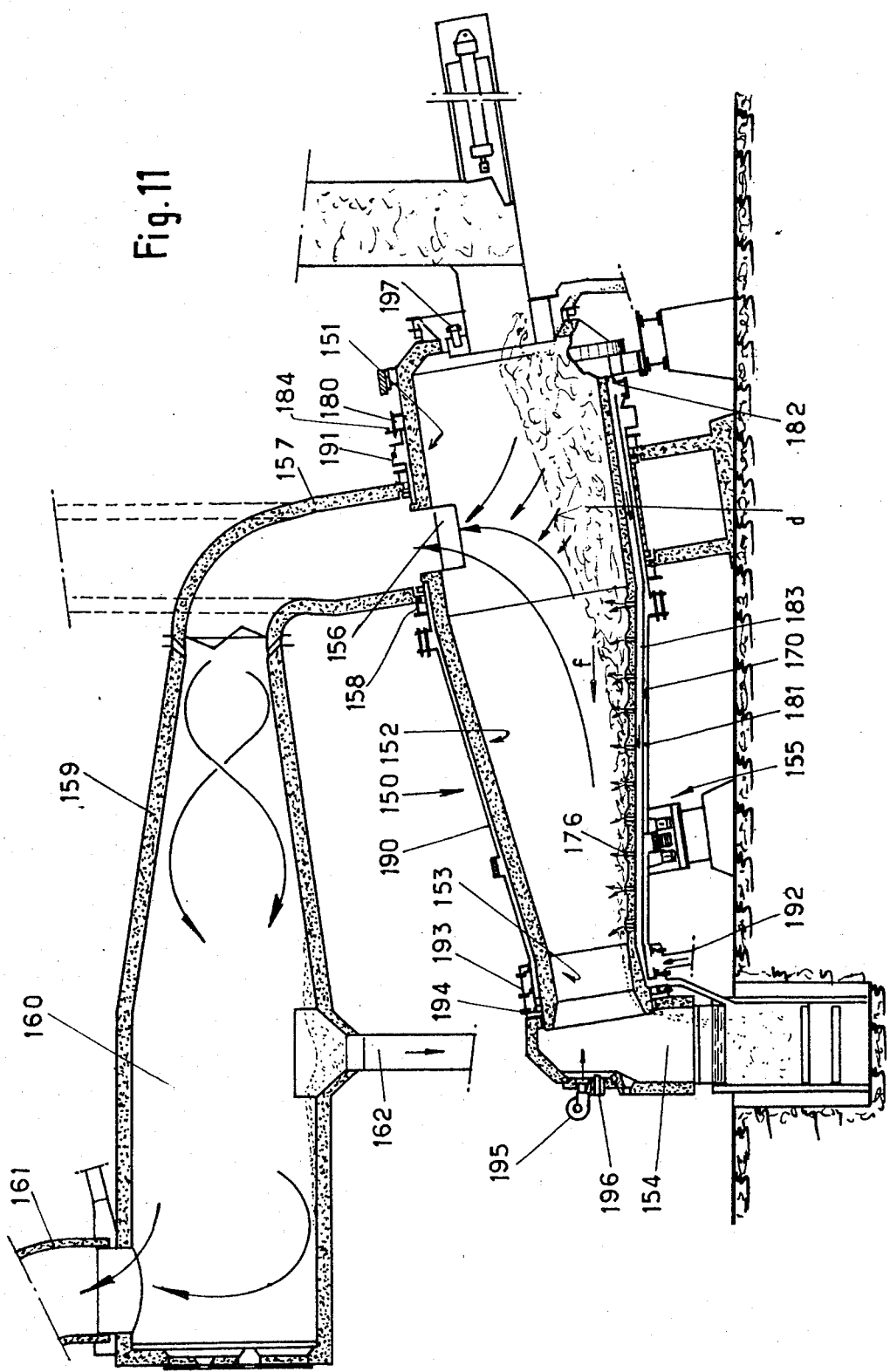
FIG. 11 is a view in lengthwise section of a part of yet another embodiment of the installation in accordance with the invention.
Figure 12:
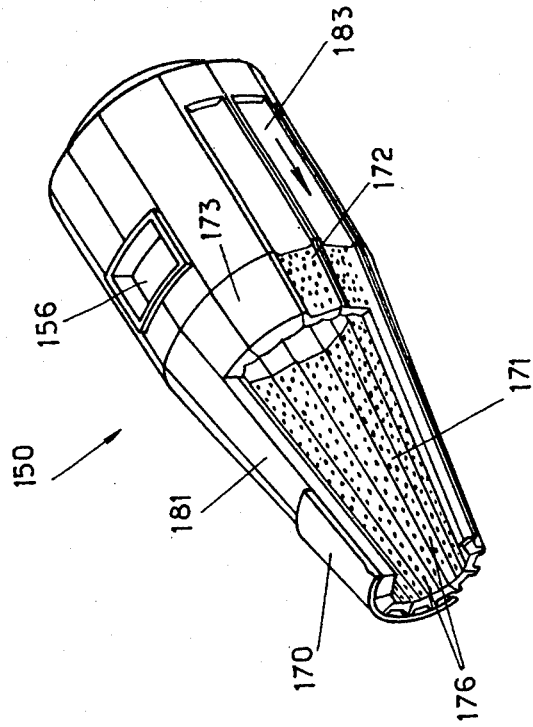
FIG. 12 is a partial view, in perspective and cutaway, of the combustion chamber of an installation shown in FIG. 11.
Figure 13:
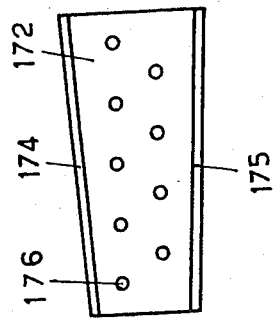
FIG. 13 is a plan view of a component of the refractory lining of the combustion chamber shown in FIGS.
Figure 15:
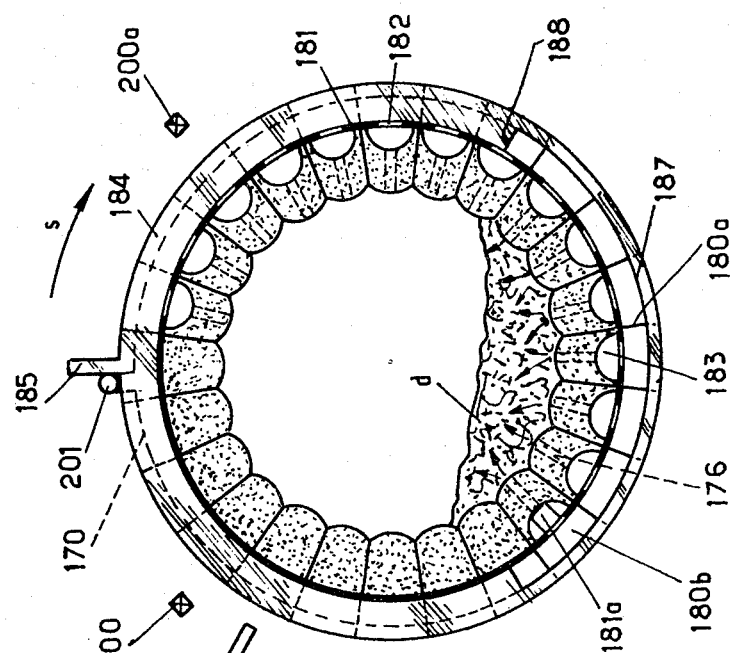
Figure 14:
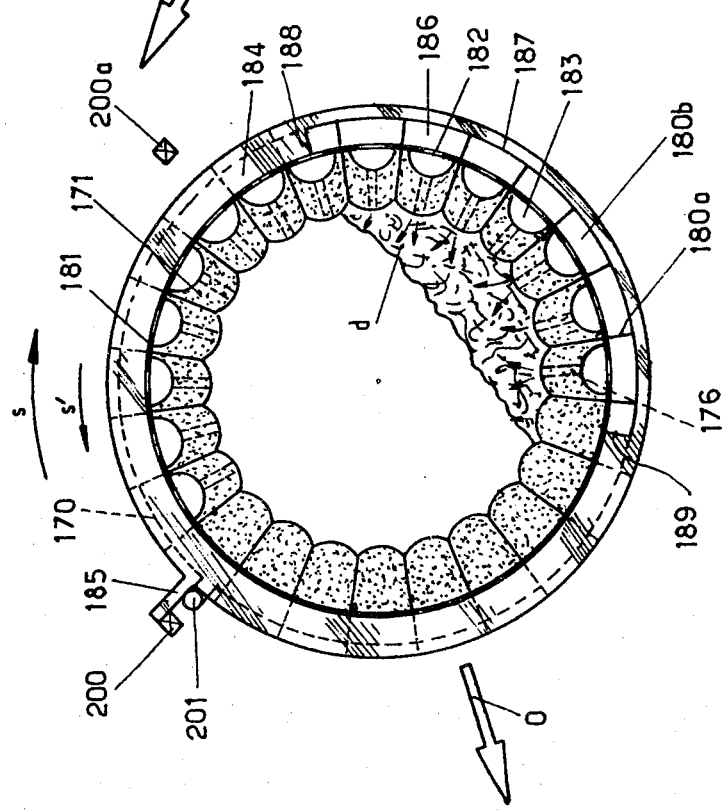
Figure 17:
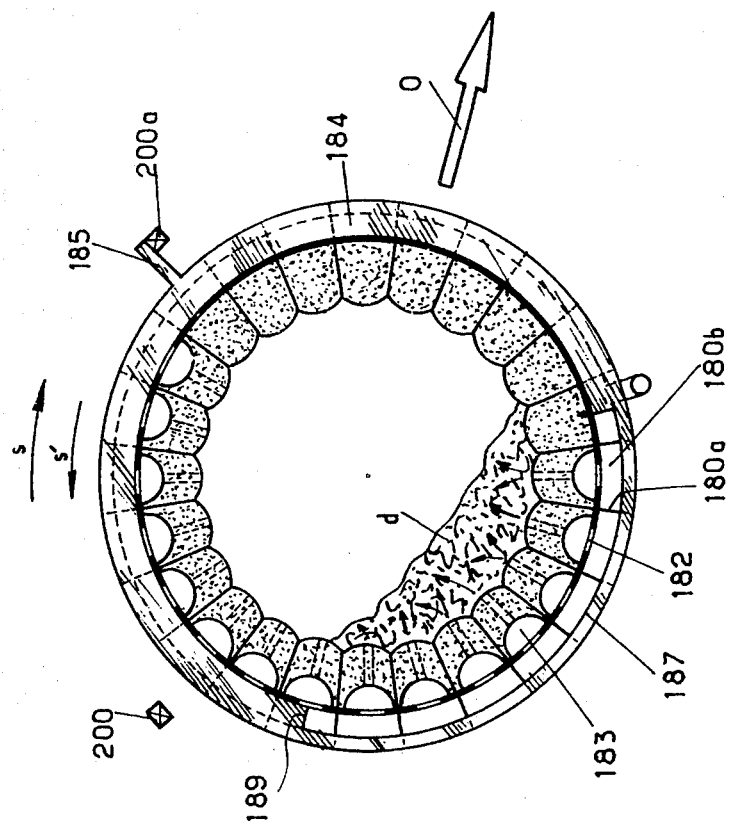
Figure 16:
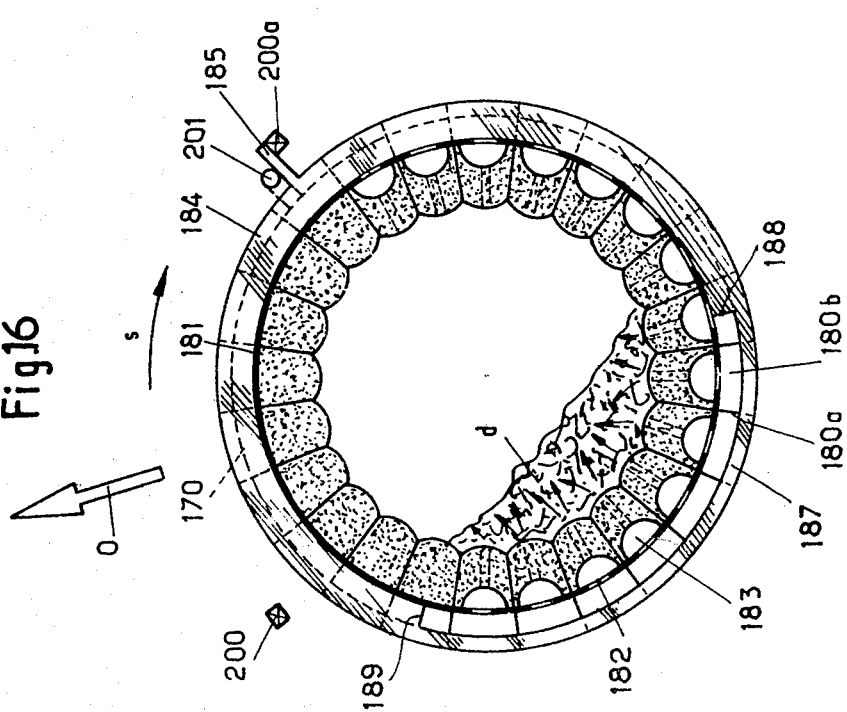

11 and 12;

FIG. 14 is a diagrammatic view in cross section of the chamber illustrated in FIGS. 11 to 13, of a first position;

FIG. 15 is a view similar to that of FIG. 14 but of another position;

FIG. 16 is a view similar to those of FIGS. 14 and 15 but of yet another position;

FIG. 17 is a view similar to those of FIGS. 14 to 16 but of yet another position.

DESCRIPTION OF THE PREFERRED EMBODIMENTS

Reference is first made to FIGS. 1 and 2 which illustrate the method of the invention for heat treatment of refuse and similar products, such as low or poor quality fuels. The refuse or fuel is introduced into a chamber 10 having a longitudinal axis 11 and which comprises from upstream to downstream — in the direction of movement of the refuse shown by the arrow $f$ — a first part 12 of generally cylindrical shape closed by a transverse end wall 13 having an opening 14 for introduction of solid refuse, a truncated conical part 15 coaxial with part 12 and positioned in such a way that the speed of flow of all the refuse is substantially uniform in its passage through this part and a second cylindrical part 16, of smaller section than that of part 12 and coaxial with it. Means, not shown, impose an oscillating movement on the chamber 10 around its axis 11 as shown diagrammatically by the double arrow $s, s'$ of FIG. 1, this reciprocating movement of partial rotation about the axis 11 causing the refuse to flow along the floor of the chamber from the output opening 14 to the downstream end of the chamber under which an ash-box 17 is envisaged. The refuse or fuel in solid form is introduced into the furnace 10 by appropriate means, for example by means of a plunger, a worm, a vibrating table or similar means whilst refuse or fuel in powder or liquid form is introduced into the furnace by injectors or equivalent means; such injection may be at the upstream end of the chamber, as indicated by arrow $i$, or at the downstream end, as shown by arrow $i'$, introduction in this zone, which is particularly advantageous in the case of liquid refuse of high calorific value, being effected in such a way that the refuse reaches the proximity of the downstream end of the chamber.

In the top part of part 12 of chamber 10 there is an opening 18 by which part of the hot combustion gases are extracted and taken, by means of ducting 19 which is provided with means of flow control 25 and means of moving the gas 29, into a post-combustion chamber 21 the top part of which has an exit 22 connected to the chimney by dust removing devices such as cyclones or similar equipment, not shown, whilst its bottom part is provided with an ash collector 23 for the particles present in the burnt gases. These can in fact be made to circulate slowly at the end of the chamber 21 if the shape of the latter is chosen to allow the gases to expand thus enabling the solid particles to agglomerate and fall into the ash-box 23.

Part of the combustion gases can also be extracted from the chamber 10 at its downstream end, above the ash-box 17, by a chimney shown diagrammatically as 24 which is also provided with means of flow control 25 to enable the combustion gases to be extracted from the chamber 10 concurrently and/or countercurrently, in adjustable proportions, depending on the refuse treated and the method of operating the installation.

As shown diagrammatically by arrows 26 and 27 on the ducting 19 and the chimney 24 respectively, means are provided to put into the combustion gases removed through opening 18 and/or chimney 24 products designed to react with said gases and chemically neutralise them or modify their characteristics, such as their hygrometry, temperature, etc.

A characteristic of the method of the invention consists in the fact that, after introduction of the refuse into the chamber 10, it is first subjected to mechanical pre-treatment, due to the oscillating movement of the chamber and to heat and/or chemical pre-treatment, such as pyrolysis, substantially in the zone of the chamber marked I on FIG. 1, which roughly corresponds to part 12 of said chamber.

After pre-treatment in this zone, and under the effect of the oscillating movement around axis 11 of the chamber 10, the refuse flows in said chamber in the direction of the arrow $f$ and passes into zone II. In this zone the addition of combustive gas from outside the chamber, as shown diagrammatically by arrows 30, combustive gas which is generally air which may or may not be preheated, causes combustion of the refuse after lighting, the combustion ashes being evacuated into the ash-box 17, whilst the combustion gases are simultaneously extracted from the chamber through the opening 18 and chimney 24, in adjustable proportions according to the nature of the refuse treated, to then be subjected to post-combustion treatment in chamber 21 from whence they are evacuated to the atmosphere after passing through dust-removers or similar equipment whilst the combustion ashes are collected in ash-box 23.

Curve 31 on FIG. 2 represents the volume of combustion gases in zones I and II, on the abcissa, and curve 32 shows the mean temperature of these gases in the same zones of the chamber 10. Curve 33 shows the mean temperature of the refuse during treatment in the different zones of the chamber, the dotted parts of curves 32 and 33 relating to extraction of combustion gases concurrently, whilst the solid parts relate to partial extraction of gases countercurrently.

Of course, the curves shown in FIG. 2 are only given as examples of a non-limiting nature, each of the curves being, in fact, within a range of the type shown partially shaded for curve 33, given that the temperature of the zones in the chamber, the volumes of gas produced and the temperatures of these gases are a function of the refuse treated, especially on the calorific power of said refuse which can vary: for household waste, currently between 1500 and 2500, whilst it is around zero for certain purification sludges, and can be between 4000 and 16,000 for used oils and solvents which are residues of industrial processes.

So, for treatment of household waste, it is introduced into the chamber in zone I where the temperature can be around 200° to 700°C. In this zone the refuse undergoes dehydration and pyrolysis, mainly under the action of the high temperature combustion gases extracted through opening 18, whilst actual combustion takes place in zone II where the temperature can reach 1800°C.

In the case of purification sludges, these are introduced by means of injectors above opening 14, in a finely sprayed form, into a zone of the chamber where the temperature is generally higher than 900°C, the solid particles falling by gravity onto the floor of the chamber, in zone I of same, whence they are propelled by the oscillating movement around axis 11 towards the actual combustion zone II.

In the case of liquid refuse of high calorific value, this is introduced, as shown by the arrow $i'$, in sprayed form, at the downstream end of the chamber where the temperature is generally higher than 900°C, this introduction being carried out in such a way that the refuse reaches zone I of the chamber.

Both liquid refuse of high calorific value and purification sludges can be introduced at either end of the chamber, i.e. sludges can be introduced at the downstream end of the chamber, as shown by arrow $i'$ whilst liquid refuse of high calorific value can be introduced at the upstream end of the chamber as shown by the arrow $i$.

If, for each of the treatment zones of the first chamber and the post-combustion chamber 21, areas limited by a horizontal plane AB and a vertical plane CD are defined, tests have shown that in the four spaces of zones I and II of chamber 10 and chamber 21 the operating temperatures were approximately those shown in the following table:

| zones | temperature part AC | temperature part BC | temperature part AD | temperature part BD |
| --- | --- | --- | --- | --- |
| I | 200 – 600 | 50 – 300 | 800 – 1500 | 300 – 600 |
| II | 900 – 1800 | 900 – 1800 | 900 – 2000 | 900 – 1500 |
| chamber 21 | 1000 – 2000 | 1000 – 2000 | 900 – 1500 | 900 – 1500 |

Reference is now made to FIGS. 3 to 9 which show a first embodiment of an installation in accordance with the invention.

Such an installation comprises the chamber 10, having a transverse end wall 13 adjacent to which is a substantially cylindrical part 12 which is extended, in the direction of flow of the refuse, by a truncated conical part 15 having a horizontal or substantially horizontal lower generatrix, with the same axis as part 12 and which connects to an end part of cylindrical configuration 16 of smaller section than part 12. The refuse to be treated is introduced into the chamber 10 by a plunger 40 slide-mounted in a passage 41 which penetrates into chamber 10 through opening 14 in the end 13 with insertion of sealing means 48 and 49, FIG. 5. The refuse introduced by the plunger 40 into the chamber 10 comes from storage bins such as 42 and 43 for household waste, whilst purification sands or sludges are stored in bins 44 and 45, served by a travelling crane 50. Bins 42 and 43 are connected to a pipe 51 which opens into the channel 41, whilst sands or sludges are propelled through a vibrating chute 46 to an injector 47 into the chamber 10.

Liquid refuse, such as used oils or similar materials are stored in tanks 52 and 53 connected respectively by ductings 54 and 55 to injectors 56 and 57, the first of which is placed above opening 14 in end wall 13 and the second opens into a flue 58 envisaged at the downstream end of the chamber for introduction of this liquid refuse into the chamber 21, as shown by dotted line on FIG. 3. One or more injectors 59 and 59A open into this flue, connected respectively, by means of ducting 60 and ducting 55A to a tank 61 of fuel such as fuel oil and to tank 53 of liquid refuse for introduction into chamber 10 of fuel and/or liquid refuse, as shown by dotted line on FIG. 3.

It is advantageous to connect some burners or similar equipment to the injectors 59 and 59A for starting actual combustion of the refuse in part 15 of chamber 10.

The latter is supported in rotation around its axis 11 by rolling tracks having rollers shown diagrammatically as 62, 63 and stopping means 122, means 64 of oscillating the chamber around the axis 11 with a reciprocating rotational movement being formed, for example, by a rack and pinion system driven by a hydraulic motor. The roof of part 12 of the chamber has an opening 70, FIGS. 4 and 6, and this opening is covered by a hood or mantle 71, in refractory material, with gas-tight joints 72 between the external wall of the chamber and said hood or mantle.

The hood or mantle 71 may either, as shown on FIG. 6, cover one part of the chamber 10, or may, in a modification, completely surround said chamber.

In the embodiment shown on FIGS. 3 to 9, the hood or mantle 71 connects to a double-skinned channel 73 the interior of which is for the flow of combustion gases coming out of chamber 10 through opening 70 and the exterior jacket of which 74 is envisaged for circulation of combustive gas, generally air, to be heated. This gas can be circulated by a fan, as shown by 121, whilst hot combustion gases can be accelerated to overcome pressure losses and simultaneously receive the addition of predetermined constituents by means of a device not shown, for example of the type described in French Patent Application No. 73.22,508 applied for by Societe HELIOX under the title: "Device for control of movement and composition of a gas stream".

The hood or mantle 71 has an opening 75 on its side wall and facing the double skin 73, which can be closed off, for connection of input injectors for gaseous fluid and/or sprayed liquids and/or powdered solids designed to modify the chemical composition of the combustion gases by addition of neutralisation products.

Figure 4:
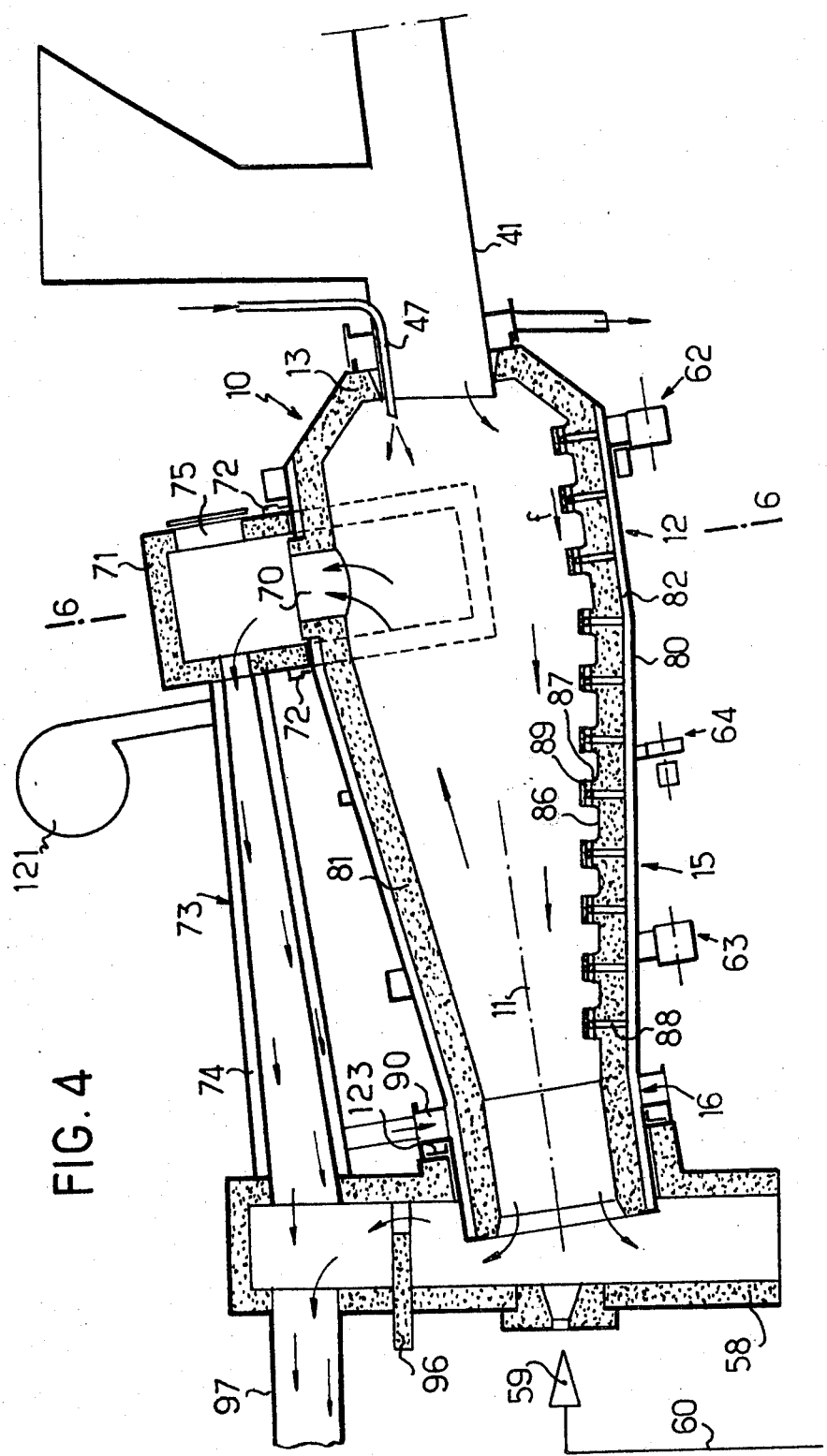
FIG. 4 is a view of a part of the installation shown in FIG. 3, on a larger scale.

The chamber is formed of an external metal casing 80, FIGS. 4, 5 and 9, lined inside with protective tiles, advantageously with refractory concrete tiles 81 spaced from the metal casing in order to form between the latter and the tiles a continuous sleeve 82 extending over the whole or the majority of said chamber. As shown on FIGS. 6 to 8, the adjoining refractory concrete tiles $81_1$, $81_2$, etc. are spaced from the casing 80 by means of studs 83 moulded into the tiles which rest on said casing. The tiles 81 line the whole of the internal face of the chamber 10 with the exception, of course, of the opening 70.

In a modification, not shown, the tiles 81 are spaced from the sleeve 80 by spacers or separators, connected to the casing 80, which fit into recesses in the external face of the tiles 81.

The latter also comprise means for distribution within the chamber of combustive gas designed to ensure actual combustion of the refuse or similar products when these, in the course of their flow, reach the truncated conical shaped part 15 of the chamber 10, or means for distribution within the chamber 10, notably in part 12 of same, of gas designed to facilitate chemical and/or heat pre-treatment to which the refuse is subjected in this part.

Distribution of gas inside the chamber is effected by means of outlets 88 which extend in the tiles 81 in substantially radial directions, which outlets can be closed off as required from outside the chamber by means of shutters 85, FIG. 5, or needle valves, or similar devices, and which open onto the internal surface 86 of the chamber through bosses or protuberances 87, FIGS. 4 to 9. The bosses or protuberances are either joined, or moulded to the refractory concrete tiles 81 and are partially perforated with holes 89 communicating with outlets 88 and the inside of the chamber.

The protuberances or bosses, 87 which project from the internal surface 86 of the chamber, prevent obstruction of the mouths of the holes 89 bringing the gas into said chamber by the liquid fraction of the refuse being treated, the shape of these protuberances being chosen to satisfy the required conditions of resistance to thermal shock and mechanical stress to which the device is subject.

For introduction of gas, essentially but not exclusively combustive gas into the sleeve 82, there is arranged in one or more transverse section of the chamber, one or more flues such as 90 FIG. 4, connected to the whole or one part only of the sleeve 82 at one end, and with a gas source, for example of combustive gas at the other end, such as air heated in jacket 74. A similar flue 90, FIG. 9, integral with the chamber and thus activated by an oscillating movement, can be connected, with the insertion of sealing means 91, to one or several pipes such as 92 and 92a, means of separation 93 being envisaged, if necessary, for distribution of gas in certain parts only of the sleeve 82, or to enable different parts of this sleeve to fed with gas of a different type, fine control of admission of this or these gases into the chamber being, as explained above, dependent on the position of shutters, needle valves or similar devices 85, connected to each of the channels 88 passing through the refractory concrete tiles 81 and communicating with the sleeve 82.

The existence of the latter between the external metal casing 80 and the refractory concrete tiles 81 also enables a gas stream, notably clean air, to be circulated from one end to the other of the chamber, for rapid extraction of the calories produced by combustion of the refuse or similar products so as to improve the output of the chamber 10 and, therefore, that of the installation which can then be used as a generator of hot and clean gases.

As indicated above with reference to FIG. 1 illustrating the method of the invention, the end of the chamber 10 downstream of the flow of refuse shown by arrow f, opens into the chimney 58 with one or more rotating joints 123 at the point where the end of the chamber passes through the wall of the chimney. An ash-box 17 is envisaged at the bottom of the chimney 58 and a shutter 96 is envisaged at the top, FIG. 4, for adjustable closing of said chimney which connects at one end with the double-skinned duct 73 and at the other end with a pipe 97 connected to the post-combustion chamber 21, a device as shown diagrammatically by 120 being advantageously envisaged between the exit orifice of the chimney 58 and the pipe 97 to control the movement of the combustion gases. Such a device is, for example, of the type described and illustrated in the aforementioned French Patent Application.

The relative output of combustion gases through the opening 70 and through chimney 58 is controlled by slide valve 96, depending on the type of refuse treated, mainly on its calorific power, its consistency etc.., so as to establish circulation of combustion gases countercurrently and concurrently in variable proportions in the installation.

The post-combustion chamber 21 shaped to allow the burned gases to expand at its downstream end, thus favouring agglomeration of the particles of these gases which are collected in the ash-box 23, is covered at the top of its downstream and by a collector 98, followed by an extractor 99 opening into cyclone devices shown diagrammatically by 100, which are themselves surmounted by dust-removers 101 connected to the chimney 102 by one or more extractors 103.

In a variation, the collector 98 is formed of a hood or mantle over an opening in the roof of the second chamber 21, whilst the latter is activated by an oscillating or rotary movement in synchronisation with the hood or mantle structure 71, joints being then envisaged at the junction of the second chamber 21 with the chimney 58 at one end and the hood forming the extractor 98 at the other end.

At the downstream end of the second chamber 21 one or more injectors 104 facilitating introduction of fuel through ducting 105 are connected to reservoir 61. In addition, means can be envisaged for introduction into the collector 98, as shown diagrammatically by arrow 106, of gaseous and/or liquid and/or powder products to modify the chemical composition of the gases emitted from cell 21 so as to emit "clean" gases to the atmosphere through the chimney 102.

The ashes collected in ash-box 17, ash-box 23 and/or ash-box 107 placed under cyclones 100 are transported away on belts shown by 108 and 109 on FIG. 3.

Figure 10:
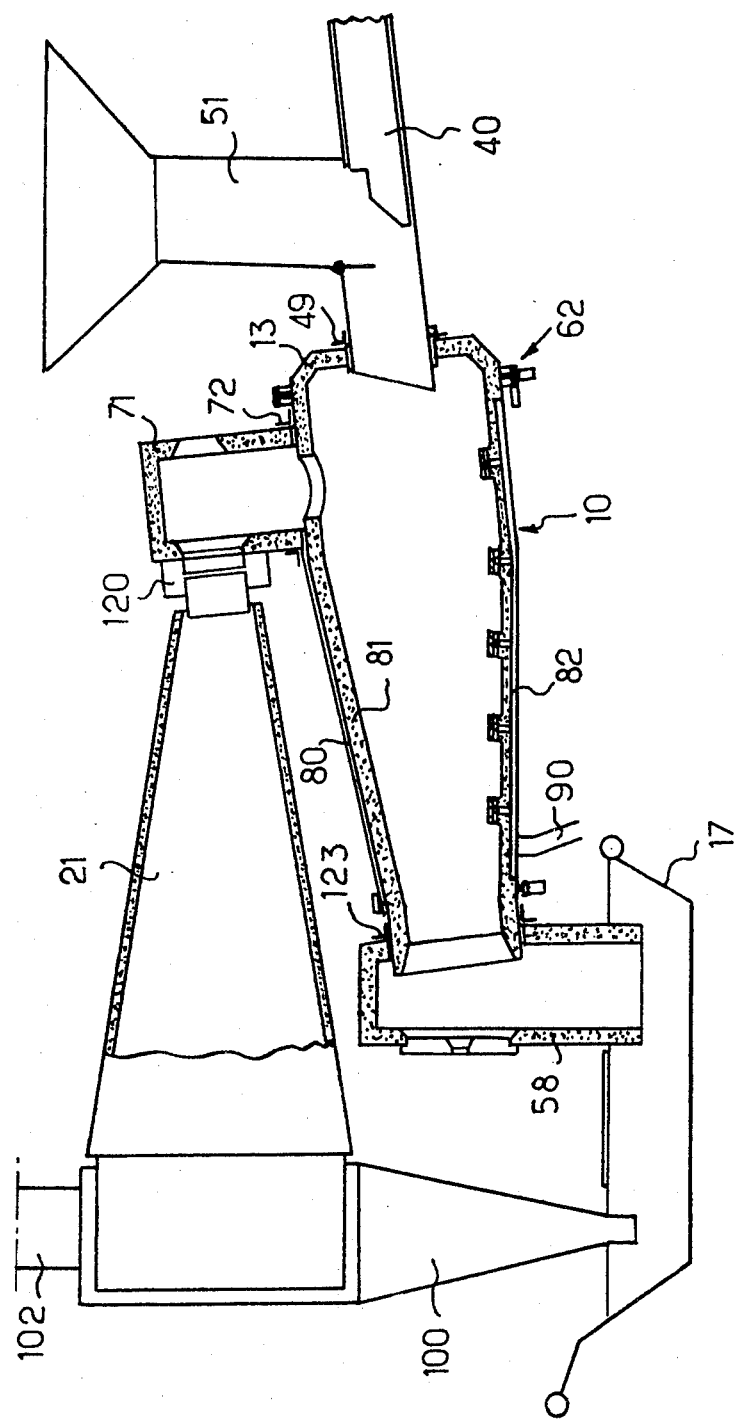
FIG. 10 is a view similar to that of FIG. 3 but for another embodiment of an installation in accordance with the invention.

Installation of the embodiment in accordance with FIG. 10 is very similar to that of the embodiment of FIGS. 3 to 9, the corresponding parts having the same references. In this embodiment, however, the outlet of the hood or mantle 71 does not connect with a duct 73 but directly with the post-combustion chamber 21 which is not connected to the chimney 58 envisaged at the downstream end of chamber 10.

Reference is now made to FIGS. 11 to 17 relating to yet another embodiment of an installation according to the invention.

In the latter, the combustion chamber 150 comprises, from upstream to downstream of the flow of the refuse d shown by arrow f, one part 151 of generally cylindrical shape, one truncated conical part 152 and a cylindrical end part 153 opening into an ash-box 154. The cell is oscillated around its longitudinal axis by means 155, the amplitude of the oscillating movement being, for example, around 210° as shown diagrammatically on FIGS. 14 to 17.

As in the preceding embodiments, the vault of part 151 has, near to the downstream end of said part, an opening 156, FIGS. 11 and 12, the position of this opening being indicated by the arrow O on FIGS. 14 to 17. The opening 156, positioned about a third of the way down the chamber from the upstream end, is covered by a hood 157, with sealing means 158 inserted between the latter and the external surface of the chamber. The hood 157 is connected by a duct 159 to a post-combustion chamber 160 in the bottom of which is envisaged a device 162 for removal of fines which is itself connected, by ducting 161, to the extractor, not shown.

The chamber 150 comprises an external casing 170 and a refractory lining 171, for example in concrete, formed of tiles such as 172 and 173, FIGS. 12 and 13. The tiles 172, certain of which are perforated with transverse outlets 176, have grooves 174 and 175 down their long sides on their external surface, whilst tiles 173 have no grooves on their long sides. Tiles 173 extend over the whole length of the chamber and over about 75° on either side of the mean longitudinal axis of the opening 156 whilst tiles 172 also extend over the whole length of the chamber but over a span of about 210°; tiles 172 with outlets 176 line the truncated conical part of the chamber whilst the unperforated tiles 172 line the part 151 up to a wind-box 180, which is integral with the chamber and situated near to the upstream end of the latter, FIG. 11.

All the tiles 172 and 173 are held in place by metal retaining sheath 181, FIGS. 11, 12 and 14, interrupted by the opening 156 and, additionally, perforated by a multiplicity of orifices 182, FIGS. 11 and 14, opposite the wind-box 180. More precisely, the retaining sheath 181 is perforated with orifices 182 the angular position and number of which correspond with the longitudinal ducts 183 formed by the external surface of said tiles, the internal face of the retaining sheath and the aligned grooves 174 and 175 of tiles 172.

If necessary, longitudinal members 181*a* contribute to immobilisation of the refractory lining in relation to the retaining sheath.

The wind-box 180, which is divided into ducts 180*b* by means of lengthwise partitions 180*a* situated in alignment with grooves 174 and 175, is closed on its transverse downstream face by a shield 184, which is annular and not integral with the chamber, the internal diameter of which is equal to that of the sheath 182 at the point of the wind-box and the external diameter of which is greater than that of the casing 170 at the point of the same box, in such a way that the shield forms a projecting rim on the external surface of the chamber 150, a radial lever 185 being integral with said rim for operation of the shield in a manner to be described below.

The shield 184 is perforated with a slot 186, limited by two radial edges 188 and 189, and by an arcuate edge 187 of about 120° the radius of which is between the radii of the internal periphery and the external periphery of the rest of the shield.

The continuous sleeve 190 between the external casing 170 and the retaining sheath 181, which extends from one end to the other of the chamber, can be opened to the atmosphere, downstream of the wind-box 180, by means of a valve-device 191, introduction of combustion and/or cooling air into said sleeve taking place at its downstream end, by ducting 192 opening into an annular duct 193 with the insertion of sealing means shown diagrammatically by 194.

Operation of the installation, provided with a burner 195 and injectors 196 and 197, is similar to that of the installations in the embodiments previously described.

Feed of combustive and/or cooling air is however controlled in a simpler way than it was in the embodiments of FIGS. 3 to 9, or FIG. 10, as explained below with reference to FIGS. 14 to 17.

As the chamber is activated with an oscillating movement around its longitudinal axis, as shown by arrows *s* and *s'*, the initial position is shown on FIG. 14 where the gas extraction opening 156 is in the position reached at the end of the anticlockwise rotation movement (arrow *s'*). In this position, the refuse *d* which covers the floor of the chamber has a free surface the slope of which is that of the landslide angle. The shield 184, the position of which is controlled by contact of the lever 185 with a fixed stop 200, has its slot 186 substantially opposite the mass of refuse *d*. The air introduced by the ducting 192 then circulates in the sleeve 190 and, assuming valve 191 is closed, penetrates into the channels 180*b* of the wind-box 180 uncovered by the slot 186 in the shield. It then passes through openings 182 adjacent to these channels and is injected through the ducts 183 and transverse outlets 176 into the mass of refuse.

When the chamber 150 is rotated by means 155 in the direction of arrow *s* a retractable knob 201 or similar device, integral with the chamber, rotates the shield 184 by cooperation with the lever 185. The refuse *d* turns with the chamber, but without relative movement in relation to the latter, and, after a quarter turn, the position is as shown in FIG. 15. During this simultaneous rotation of the chamber and the shield 184, the combustion air continues to be injected by the same ducts 183 and transverse outlets 176 as those previously travelled by the air introduced at the downstream end of the chamber which is heated during its circulation in the sleeve 190.

After another quarter turn, the position is that shown in FIG. 16. The lever 185 is then in contact with a second fixed stop 200*a* which is symmetrical with the stop 200 in relation to the mean vertical plane of the installation. During the rotation between the positions illustrated in FIGS. 15 and 16, the mass of the refuse *d* is displaced without relative movement in relation to the chamber and, at the end of this rotation, its free surface is substantially symmetrical with that shown on FIG. 14 in relation to the mean vertical plane of the installation.

When rotation of the chamber 150 is continued in the direction of arrow *s*, until the position shown on FIG. 17 is reached, the shield 184 remains stationary, cooperation of the lever and stop 200*a* causing retraction of the knob 201 or similar device. In proportion with the rotation of about 120° from the position shown in FIG. 16, the slide of the volume of refuse causes relative displacement of same in relation to the refractory lining of which substantially only the transverse outlets 176 gradually covered by the refuse *d* are fed with combustion air from the ducts 183, the openings 182 and channels 180*b* which pass in front of the slot 186 in the shield 184 which is now stationary.

A similar process to that described above takes place when, starting from the position shown in FIG. 17, the means 155 rotate the chamber in the direction opposite to the arrow *s'*.

Feeding of the chamber with combustive air with injection of the air into the mass of refuse during treatment is thus ensured automatically.

However, for treatment of particular refuse, for example rich refuse, for which it is not desirable to favour combustion by injection of air, the shield 184 can, by means of lever 185 and after removing stops 200 and 200*a*, be brought to a position in which the ducts 183 are no longer fed, the wind-box 182 being thus put out of operation. For such a method of use, the valves 191 can be opened and air circulation introduced by ducting 192 is then put to use for extraction of the calories produced in the oscillating chamber 150.

Of course, for treatment of refuse of average calorific value, simultaneous opening of the valve 191 and use of the shield 184 in an intermediate position facilitates simultaneous evacuation of the calories produced and feed to the ducts 183 connected to the outlets 176 for air injection into the volume of refuse being treated, in proportions to be chosen as required.

I claim:

1. Installation for the heat treatment of refuse of any type and similar products such as low or poor quality fuels, comprising a one piece combustion chamber formed of three coaxial parts:
   a. a substantially cylindrical part having a transverse end wall with an opening for input of the refuse and similar materials;
   b. a truncated conical part; and
   c. a cylindrical part connecting to the previous part, there being an opening in the vault of the chamber for combustion gas to flow through, said opening being provided at the downstream end of the refuse input part, — relative to the direction of flow of the latter —,
   a gas collection hood sealingly mounted onto the external wall of the chamber and covering said vault opening, and
   means for imparting to said chamber an oscillating movement around its longitudinal axis in order to propel the refuse and similar products between the entrance and the exit of the chamber.

2. Installation according to claim 1, wherein the chamber comprises an external metal casing and an internal refractory lining at least partially perforated with substantially radial transverse outlets, said lining being formed of refractory concrete tiles kept at a distance from the casing by spacing means whereby a sleeve is formed between said casing and the refractory lining through which combustion and/or cooling air can flow continuously from one end to the other of the chamber.

3. Installation according to claim 2, further comprising at least one flue integral with the casing and positioned in a transverse section of the chamber, for introduction and evacuation of air into and out of said sleeve.

4. Installation according to claim 2, wherein said transverse outlets open into the chamber by means of holes in the projecting protuberances on the internal face of the concrete tiles, and further comprising means for adjustably closing said outlets, whereby is achieved introduction of gas into the chamber and evacuation from the same of a fluid for the recovery of the calories produced by treatment of the refuse.

5. Installation according to claim 2, wherein said sleeve is connected to a device for introduction of combustion or cooling air into said sleeve, positioned at the downstream end of the latter relative to the direction of flow of the refuse, said sleeve being closed at the end opposite to the air introduction end by an annular shield not integral with the chamber and in which is cut an arcuate slot whereby is afforded selective communication between said sleeve and longitudinal ducts extending under the refractory lining into which open said transverse outlets.

6. Installation according to claim 1, wherein the transverse air injection outlets into the chamber are located in the truncated conical part of the latter, over its entire length and on a portion of the cylindrical part, but on only one zone of the refractory lining, over a span of about 210° of the floor and the side walls of the chamber.

7. Installation according to claim 5, further comprising mechanical means for coupling the movement of the shield to part of the oscillation movement of the chamber.

8. Installation according to claim 7, wherein said mechanical means, which can be rendered operational and non-operational as required, comprise a drive knob integral with the chamber adapted to cooperate with a radial lever projecting on the external periphery of the annular shield.

9. Installation according to claim 5, wherein the oscillation movement of the chamber has an amplitude of about 210°, the longitudinal ducts and the transverse outlets of the refractory lining being located over a span substantially equal to that of the amplitude of oscillation and the slot in the shield extending over about 120°.

10. Installation according to claim 5, wherein the sleeve is adapted to be connected to the atmosphere by discharge valves situated near the shield.

11. Installation according to claim 5, wherein the ducts are formed by alignment of grooves extending on the longitudinal edges of the refractory tiles, said tiles being covered with a metal retaining sheath extending over the entire length of the chamber with the exception of the vault gas collection opening and with the exception of the orifices situated in positions corresponding with those of the ducts, downstream of the shield relative to the direction of flow of the refuse.

12. Installation according to claim 1, further comprising, distinct from the chamber, at least one post-combustion chamber for the gases extracted from said chamber.

13. Installation according to claim 12, further comprising means for introduction into said post-combustion chamber and into the ducting provided between said post-combustion chamber and the first chamber, of agents to chemically neutralise the combustion gases.

14. Installation according to claim 12, wherein the downstream end of the chamber opens into a chimney adapted to communicate with the post-combustion chamber, with adjustable shutting means between said chimney and said post-combustion chamber.

15. A combustion chamber for the heat treatment of refuse and similar products comprising a cylindrical part into which the refuse and similar products to be treated are introduced, an opening in the vault of said part at the downstream thereof, a truncated conical shaped part the lower generatrix of which, when in operation, is slightly inclined to the horizontal, said part being downstream of the cylindrical part relative to the direction of flow of the refuse, and a hood covering said opening for collection of the combustion gases.

16. Chamber according to claim 15, wherein the truncated conical part is extended, at its upstream end, by a cylindrical part.

17. A method of heat treatment of refuse and similar products in a combustion chamber having an oscillating movement around its longitudinal axis, comprising the steps of introducing the refuse and similar products into said chamber, submitting the products to be treated simultaneously to a mechanical pre-treatment due to the oscillating movement of the chamber and to a pyrolysis by the action of direct radiation of at least a part of the combustion gases which are made to circulate countercurrently, and submitting these products to combustion as they proceed along the chamber.

18. Method according to claim 17, wherein the part of the combustion gases which circulates countercurrently is extracted from the chamber at the end of the zone where the pre-treatment of the refuse and similar products takes place.

19. Method according to claim 17, wherein a part of the combustion gases is also extracted from the chamber at the end thereof opposite to the end where pre-treatment of the refuse takes place, whereby the combustion gases are extracted from the chamber simultaneously and in variable proportions concurrently and countercurrently to the direction of flow of the refuse.

20. Method according to claim 17, wherein the combustion gases extracted from the chamber are burned in a post-combustion chamber which is separate from the first chamber, after adding, if necessary, chemical neutralisation products and wherein, before their evacuation into the atmosphere, said gases are treated in dust-removers, cyclones and similar devices.

21. Method according to claim 17, wherein the temperature of the refuse in the pre-treatment zone is between 200° and 600°C, the temperature of the combustion gases at the end of this zone being between 800° and 1500°C, whilst the temperature of the refuse and similar products being treated is of the order of 900° to 1800°C in the actual combustion zone where the temperature of the combustion gases is between 1000° and 2000°C.

22. Method according to claim 17, wherein liquid refuse of high calorific value or fuel in solid or sprayed liquid form is introduced into the chamber or into a chimney adjacent to the downstream end of the latter.

23. The installation according to claim 12, wherein the post-combustion chamber is provided for the gases extracted from said chamber concurrently.

24. The installation according to claim 12, wherein the post-combustion chamber is provided for the gases extracted from said chamber countercurrently.

25. The installation according to claim 12, wherein the post-combustion chamber is provided for the gases extracted from said chamber concurrently and countercurrently in a simultaneous manner.

* * * * *